J. NESBITT.

Slide-Valves.

No. 5,309. Reissued March 4, 1873.

*Witnesses:*

John Burkman

Harry Coleman

*Inventor:*

John Nesbitt by atty A Louck

AM. PHOTO-LITHOGRAPHIC CO. N.Y. (OSBORNE'S PROCESS.)

UNITED STATES PATENT OFFICE.

JOHN NESBITT, OF EAST BOSTON, MASS., ASSIGNOR TO WILLIAM G. ULERY.

IMPROVEMENT IN SLIDE-VALVES.

Specification forming part of Letters Patent No. 110,490, dated December 27, 1870; reissue No. 5,309, dated March 4, 1873.

DIVISION A.

*To all whom it may concern:*

Be it known that I, JOHN NESBITT, formerly of Concord, in the county of Merrimack and State of New Hampshire, now of East Boston, Massachusetts, have invented a new and useful Improvement in Slide-Valves, of which the following is a specification:

The invention herein comprised relates especially to balanced slide-valves—that is to say, slide-valves that are held down positively upon their seats, so that they cannot rise therefrom, as shown, for instance, in Letters Patent granted to me March 19, 1867.

In the use of a valve of this kind, when the throttle-valve of the engine is closed and the cylinder-piston continues in motion—as, for instance, in the case of a locomotive-engine with steam shut off and traveling on a descending grade—a vacuum is formed behind the moving cylinder-piston, which greatly retards the motion and injures the machinery.

The object of the invention is to overcome this difficulty; and to this end it consists in the combination, with the valve and its inclosing-case, of one or more puppet or other valves, applied either to the valve or to its case, and in constant communication with the exhaust-cavity of the valve, automatically operating to admit air from the said exhaust-cavity into the interior of the steam-chest when steam is shut off and the engine continues in motion, as hereinafter described.

Figure 1:
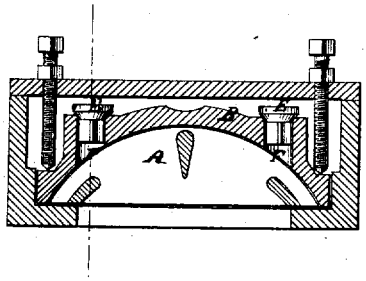
Figure 2:
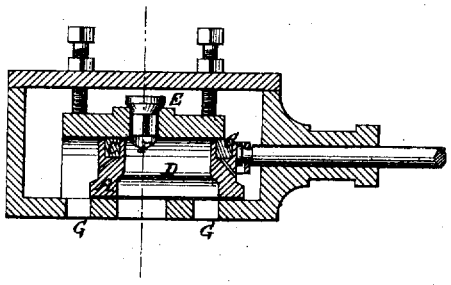

In the drawing, Figure 1 is a transverse section through a valve-chest and valve, showing the application of my improvements; and Fig. 2 is a longitudinal sectional elevation of the same.

Similar letters of reference indicate corresponding parts.

As above stated, the puppet-valves may be applied either to the valve or to its inclosing-case. In the arrangement shown in the drawing the puppets are represented as located in the valve-case, and the exhaust-cavity of the valve is open at the top so as to communicate with the valve-openings in the case.

A is a slide-valve, working steam-tight under the case B, for the purpose of balancing it, the said valve carrying sections of packing-rings in the grooves C, working against the under side of case B, to which they are fitted steam-tight.

It is obvious that this valve, or any balanced in a similar manner, cannot be raised off its seat, as the ordinary slide-valves can, by the atmospheric pressure in the exhaust-port D when steam is shut off from the engine and the latter continues in motion, as in the case of a locomotive going down an incline; consequently a vacuum will be formed behind the piston, which will powerfully resist the motion of the engine.

I therefore propose to provide for admitting the air to the steam-chest to enter the cylinder at the ports in the same manner that the steam does, to prevent the formation of the vacuum.

The plan which is here shown for accomplishing this is to arrange the puppet-valves E in suitable openings F, through the case B, leading from the exhaust-cavity D, which is cut through the top of the valve, to the steam-space in the steam or valve chest, so that they will be kept closed by steam-pressure while steam is admitted to the chest, but will be opened by the back pressure of the air through the exhaust as soon as the steam is shut off. The air so admitted to the steam-chest will flow through the steam-ports G and follow up the piston, thereby preventing the forming of a vacuum behind it.

What I here claim, and desire to secure by Letters Patent, is—

The combination of the slide-valve and its inclosing-case with one or more puppet-valves, arranged to have constant communication with the exhaust-cavity of the valve, substantially as described, and operating automatically to admit air therefrom into the steam-chest at the time and in the manner set forth.

In testimony whereof I have hereunto signed my name in presence of two subscribing witnesses.

JOHN NESBITT.

Witnesses:
M. BAILEY,
EDM. F. BROWN.